FIG. 1

3,705,096
DUAL-ZONE AND DUAL-CATALYST REFORMING PROCESS

David A. McCaulay, Homewood, Albert L. Hensley, Jr., Munster, and John A. Mahoney, Griffith, Ind., assignors to Standard Oil Company, Chicago, Ill.
Filed Oct. 30, 1970, Ser. No. 85,688
Int. Cl. C10g 39/00
U.S. Cl. 208—65                                    30 Claims

ABSTRACT OF THE DISCLOSURE

A petroleum hydrocarbon fraction is contacted in a first reforming zone with a first catalyst comprising a Group VIII noble metal, a halide, and alumina to produce a first reformate, which is subsequently contacted in a second reforming zone with a second catalyst comprising the oxides of chromium, a member selected from the group consisting of an oxide of an alkali metal, an oxide of an alkaline earth metal, and mixtures thereof, and alumina. The second catalyst may contain also a small amount of rhenium. The first reformate should possess a paraffins-to-naphthenes ratio of at least 5 to 1.

BACKGROUND OF THE INVENTION

One of the important petroleum refining processes that are employed to provide high-octane-number hydrocarbon blending components for gasoline is the reforming process. In the typical reforming process, aromatics are produced by means of (1) the dehydrogenation of six-carbon-ring naphthenes, (2) the isomerization of five-carbon-member rings to six-carbon-member rings, and the subsequent dehydrogenation of the six-carbon-member rings, and (3) the dehydrocyclization of paraffinic hydrocarbons to aromatics.

Petroleum naphthas and gasoline-boiling-range hydrocarbons are converted in the typical reforming process in the presence of various catalysts. Typical of these catalysts are chromium-oxides-on-alumina catalysts, molybdena-on-alumina catalysts, and platinum-halogen-on-alumina catalysts. Today, the catalysts that are most often employed in the reforming process by the petroleum refining industry are the platinum-halogen-on-alumina catalysts.

The prior art suggests that (1) the chromia catalysts, i.e., the chromium-oxides-on-alumina catalysts, possess low activity for isomerization and low activity for the isomerization and dehydrogenation of five-carbon-member ring naphthenes to aromatics; (2) the rate of dehydrogenation of naphthenes to aromatics obtained with chromia catalysts is much lower than that observed with platinum catalysts; and (3) the chromia catalysts must be used at low pressures where coke formation rapidly deactivates the catalysts. Chromia catalysts, however, convert the five-carbon-member-ring naphthenes to coke, as well as to aromatics. The chromia catalysts are more selective in converting paraffins to aromatics than are the platinum catalysts. It has been found that chromia-on-alumina catalysts that are promoted with a member selected from the group consisting of an alkali metal, an alkaline earth metal, an oxide thereof, or mixtures thereof, are very good catalysts for converting paraffins to aromatics.

Now it has been found and has been disclosed in a co-pending application, Ser. No. 66,796, that a chromia-on-alumina catalyst which is promoted with a small amount of rhenium has provided activity and selectivity maintenances that are superior to those furnished by prior-art chromia-on-alumina catalysts.

In addition, an improved process for catalytically reforming a naphtha to produce a much higher octane number product has been found. This improved process comprises two separate reforming zones, the first of which employs the conventional or ordinary platinum-on-alumina reforming catalyst and the second of which employs a catalyst comprising chromia-on-alumina promoted with an oxide of an alkali metal, an oxide of an alkaline earth metal, or a mixture thereof.

SUMMARY OF THE INVENTION

Broadly, according to the present invention, there is provided an improved process for reforming a petroleum hydrocarbon fraction to obtain a product having a high octane number, which process comprises contacting said hydrocarbon fraction in a first reforming zone under reforming conditions and in the presence of hydrogen with a first catalyst comprising a Group VIII noble metal, a halide, and a catalytically active alumina to produce a first reformate and subsequently contacting said first reformate in a second reforming zone under reforming conditions and in the presence of hydrogen with a second catalyst comprising the oxides of chromium, a member selected from the group consisting of an oxide of an alkali metal, an oxide of an alkaline earth metal, and mixtures thereof, and catalytically active alumina. The hydrocarbon effluent from said first reforming zone, that is, the hydrocarbon stream being introduced into said second reforming zone, should have a paraffins-to-naphthenes ratio of at least 5 to 1. Therefore, operating conditions in the first reforming zone are selected to provide an effluent from said first reforming zone which has a paraffins-to-naphthenes ratio of at least 5 to 1. Moreover, the preferred catalyst in said second reforming zone contains a small amount of rhenium, namely, about 0.1 to about 5.0 weight percent based on the total weight of said second catalyst.

The improved reforming process of the present invention, which process has two distinct reforming zones, provides much higher yields of both $C_5{}^+$-reformate and heavy reformate than do the conventional high-severity reforming processes employing solely platinum-halide-alumina catalysts or reforming processes employing a chromia-on-alumina catalyst in a single zone at a low pressure.

BRIEF DESESCRIPTION OF THE DRAWINGS

Three drawings accompany this application.

DESCRIPTION AND PREFERRED EMBODIMENTS

The highly mechanized society of today requires an increasing demand for motor fuels having very high octane numbers. One of the sources of such high octane numbers comprises aromatics resulting from the reforming of petroleum hydrocarbon fractions. Such aromatics can be obtained by both the dehydrogenation of the naphthenes in the petroleum hydrocarbon fractions and the dehydrocyclization of paraffins.

The improved process of the present invention provides an excellent means for upgrading the octane number of a petroleum hydrocarbon fraction. This improved process comprises two reforming zones, a first reforming zone and a second reforming zone. Each zone contains a catalyst that is different and distinct from the catalyst in the other. Broadly, the process comprises contacting the petroleum hydrocarbon fraction that is to be reformed in said first reforming zone under suitable reforming conditions and in the presence of a hydrogen-affording gas with a catalyst comprising a Group VIII noble metal, a halide, and catalytically active alumina, and contacting the effluent from said first reforming zone, a first reformate, in the second reforming zone under reforming conditions and in the presence of hydrogen with a catalyst comprising the oxides of chromium, a member selected from the group consisting of an oxide of an alkali metal, an oxide of an alkaline earth metal, and mixtures thereof, and catalytically active alumina. The first reformate should possess a paraffins-to-naphthenes ratio of at least 5 to 1.

Each of the reforming zones may comprise one or more catalyst beds disposed in one or more reactors. A preferred catalyst in the second reforming zone may contain a small amount of rhenium, namely, an amount within the range of about 0.1 weight percent to about 5.0 weight percent, based on the total weight of the second catalyst.

The catalyst that is employed in the first reforming zone is a catalyst which comprises a Group VIII noble metal, a halide, and catalytically active alumina. This catalyst may also contain rhenium up to an amount that is equivalent to the amount of Group VIII noble metal in the catalyst. The preferred Group VIII noble metal is platinum and is present in an amount within the range of about 0.1 to about 2 weight percent, based on the total weight of the first catalyst. While either chloride or fluoride may be used in this catalytic composition as the halide, chloride is preferred and is present in an amount within the range of about 0.1 to 5 weight percent, based on the total weight of the first catalyst.

The catalytically active alumina that is used in the first catalyst in the first reforming zone may be one of the more catalytically active aluminas, e.g., gamma-alumina or eta-alumina. This alumina should have an average pore diameter of at least 45 angstrom units (A) and a surface area within the range of about 100 square meters per gram to about 800 square meters per gram. The aluminas having large pore diameters, which aluminas are discussed hereinbelow, may also be used as supports for the first catalyst employed in the first reforming zone of the process of the present invention.

Methods of preparation of catalysts comprising a Group VIII noble metal, a halide, and alumina are well known to those having ordinary skill in the art and, therefore, will not be discussed here.

The catalytic composition that is employed in the second reforming zone of the improved process of the present invention comprises the oxides of chromium, primarily $Cr_2O_3$, and a member selected from the group consisting of an oxide of an alkali metal, an oxide of an alkaline earth metal, and mixtures thereof, on catalytically active alumina. Preferably, this catalytic composition also contains a small amount of rhenium. The oxides of chromium may be present in an amount within the range of about 5 weight percent to about 25 weight percent, calculated as $Cr_2O_3$ and based on the total weight of the second catalyst; the rhenium may be present in an amount within the range of about 0.1 weight percent to about 5.0 weight percent, based on the total weight of the second catalyst; and the alkaline component or member may be present in an amount within the range of about 0.1 to about 5.0 weight percent, calculated as the oxide and based on the total weight of the second catalyst.

While the alumina that is employed as a support material in the second catalyst of the present invention may be a catalytically active alumina that is used in the first catalyst, it is preferred that an alumina having a large pore diameter be employed in the second catalyst. A large-pore diameter alumina should possess a surface area of about 100 square meters per gram to about 800 square meters per gram. The average pore diameter of such a large-pore diameter alumina should be within the range of about 70 A. to about 200 A., suitably within the range of about 125 A. to about 180 A., and preferably within the range of about 135 A. to about 160 A. The surface area of such large-pore diameter alumina will fall advantageously within the range of about 150 square meters per gram to about 500 square meters per gram, suitably within the range of about 200 square meters per gram to about 350 square meters per gram.

Suitable aluminas can be purchased from manufacturers of catalysts. For example, Nalco 471 aluminas are available from the Nalco Chemical Company. These aluminas can be obtained with pore volumes from as low as 0.54 cubic centimeters per gram to as high as 2.36 cubic centimeters per gram and a corresponding average pore diameter within the range of about 72 A. to about 305 A. Therefore, those Nalco 471 aluminas which have the desired physical properties are suitable for use as the support of the catalytic composition of the present invention.

In addition, suitable aluminas can be obtained from the American Cyanamid Company. For example, a typical sample of American Cyanamid's Aero Extrudate 100, Sample No. 2234–2, was found to have an average pore diameter of 138 A. and a surface area of 238 square meters per gram.

The second catalyst of the present invention can be prepared in several ways. For example, the catalyst can be made by impregnating the catalytically active alumina with an aqueous solution of either chromium nitrate, ammonium chromate, chromic acid, or ammonium dichromate. The chromium-containing alumina support can then be impregnated with a suitable aqueous solution of a rhenium compound. On the other hand, the catalyst can be prepared through the formation of a chromina-alumina aerogel. Ethylene oxide is added to a solution of ammonium chloride, chromic chloride, and glycerol. The catalyst may also be prepared by impregnating the ignited carrier with an aqueous solution of chromium nitrate. Moreover, the catalyst may be prepared by co-precipitation employing solutions of chromic acetate and sodium aluminate. The alkaline promoter compound or element may be added prior to co-gelling or co-precipitation of the chromia and the alumina. The rhenium may be introduced into the catalyst composite by impregnating the alumina containing the other components with a solution of a suitable rhenium compound such as perrhenic acid, $HReO_4$, rhenium heptaoxide, $Re_2O_7$, and ammonium perrhenate, $(NH_4)ReO_4$. Such methods of preparation are not the only ways of preparing the second catalyst and, therefore, this summary of preparation methods is not intended to exclude other methods which are not described herein from being used in the preparation of the second catalyst of the present invention.

Both catalysts of the process of the present invention may be used in a fixed bed or beds. In such case, the catalyst would be in the form of either pellets or extrudates. However, either catalyst could be employed in a moving bed type of operation. In addition, either catalyst could be employed in one or more fluidized beds of finely-divided catalyst particles.

The improved process of this invention may be used to reform a feedstock which is a member selected from the group consisting of a virgin naphtha, a cracked naphtha, a hydrocarbon fraction boiling in the gasoline boiling range, and mixtures thereof. A naphtha will exhibit a boiling range of about 70° to about 500° F., preferably, about 180° to about 400° F. The gasoline boiling range comprises temperatures of about 120° to about 420° F., preferably, about 140° to about 380° F. Since many of the above feedstocks may contain appreciable amounts of nitrogen and sulfur compounds, which are deleterious to the first catalyst of the process of the present invention, it is preferred that such feedstocks be subjected to a suitable hydrodesulfurization and/or hydrodenitrogenation treatment, such as hydrofining, prior to use in the process of the present invention in order to reduce both the nitrogen and sulfur levels to tolerable limits.

Suitable reforming conditions that may be employed in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 standard cubic feet of hydrogen per barrel of hydrocarbons (s.c.f.b.) to about 12,000 s.c.f.b., and a liquid hourly space velocity (LHSV) of about 0.1 to about 10 volumes of hydrocarbon per hour per volume of catalyst. For the first reforming zone, preferred operating conditions comprise an average catalyst bed temperature of about 800° F. to about 950° F., a total pressure of about 50 p.s.i.g. to about 400 p.s.i.g., a hydrogen-to-hydrocarbon ratio of about 2,000 s.c.f.b. to about 9,000 s.c.f.b., and a LHSV of about 1.0 to about 5.0 volumes of hydrocarbon per hour per volume of catalyst. It is to be remembered that the conditions must be selected to provide a first reformate, i.e., the effluent from the first reforming zone, that has a paraffins-to-naphthenes ratio of at least 5 to 1, preferably, about 9 to 1.

Suitable operating conditions for the second reforming zone comprise an average catalyst bed temperature of about 900° F. to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst. Preferred operating conditions include: an average catalyst bed temperature of about 920° F. to about 1,000° F., a total pressure of about 20 p.s.i.g. to about 45 p.s.i.g., a hydrogen-to-hydrocarbon ratio of about 1,000 s.c.f.b. to about 5,000 s.c.f.b., and a LHSV of about 0.2 to about 1.5 volumes of hydrocarbon per hour per volume of catalyst.

Unwanted products in the reforming of aliphatic hydrocarbons containing at least six carbon atoms per molecule are light hydrocarbon gases and coke. Such products and other compounds, such as polynuclear aromatics and heavy hydrocarbons, result in coke. As the operation progresses, a substantial amount of coke accumulates on the surface of each of the catalysts, resulting in an increasingly rapid rate of catalyst deactivation. Consequently, the coke must be removed periodically from the surface. Such coke removal may be accomplished through a coke-burn treatment wherein the coke-containing catalyst is contacted with an oxygen-containing gas at selected temperatures. Typically, the gas will contain oxygen within the range of about 1.0 volume percent to about 21.0 volume percent. The concentration of oxygen in the gas should be maintained at a level which will not result in the production of temperatures that are in excess of 1,100° F., preferably in excess of 1,050° F.

While the coke must be removed periodically from each of the catalysts, i.e., the catalyst in the first reforming zone and the catalyst in the second reforming zone, the coke on the catalyst in the second reforming zone must be removed more frequently than that on the catalyst in the first reforming zone. Therefore, the catalyst in the second reforming zone, i.e., the second catalyst, will be regenerated much more frequently than the catalyst in the first reforming zone. In any event, both catalysts must be capable of withstanding the conditions employed in the regeneration. Both catalysts employed in the process of the present invention are capable of being regenerated.

Figure 1:
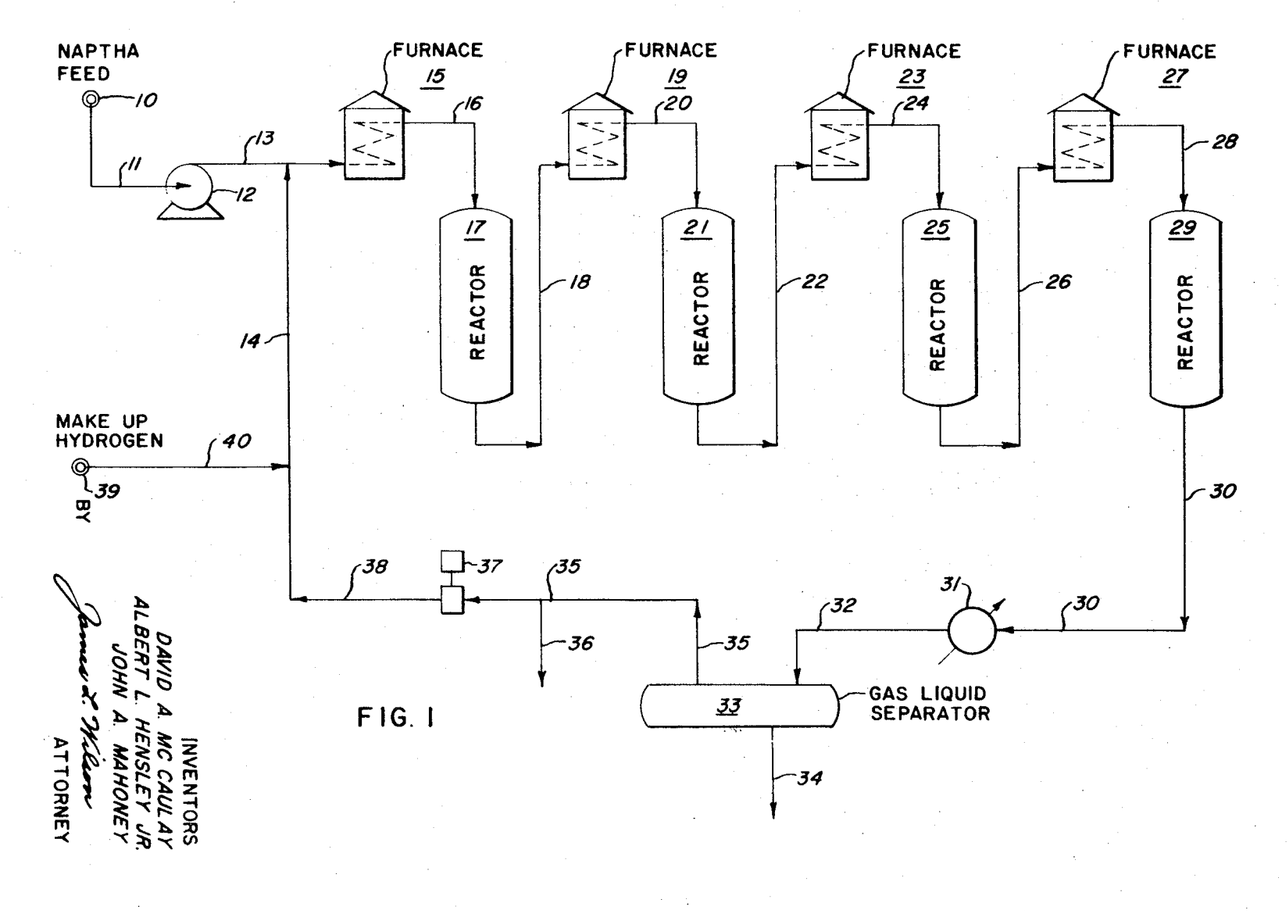
FIG. 1 presents a simplified schematic flow diagram of a preferred embodiment of the process of the present invention.

A preferred embodiment of the present invention is depicted in the accompanying FIG. 1. FIG. 1 is a simplified schematic flow diagram of a preferred embodiment of the improved process of the present invention. It does not include certain auxiliary equipment, such as heat exchangers, valves, pumps, compressors, and associated equipment, which would be needed in various places along the flow path of the process in addition to the pump and compressor depicted in the drawing. Such additional auxiliary equipment and its location requirements would be quickly recognized by one having ordinary skill in the art. Therefore, such equipment is not shown in the figure.

In the embodiment represented in FIG. 1, a naphtha heart cut, having a boiling range of about 160° F. to about 400° F., preferably, about 180° F. to 380° F., is obtained from source 10. This feedstock is passed from source 10 through line 11 into pump 12, which pumps the hydrocarbon through line 13. Hydrogen-containing recycle gas is introduced into line 13 via line 14 to be mixed with the hydrocarbons in line 13. The hydrogen-hydrocarbon mixture passes through line 13, furnace 15, and line 16 into the top of reactor 17. The material is introduced into reactor 17 at a temperature of about 940° F. The pressure in reactor 17 is within the range of about 60 p.s.i.g. to about 70 p.s.i.g. The effluent from reactor 17, having an outlet temperature of about 762° F., passes through line 18, furnace 19, and line 20 into the top of reactor 21. Sufficient heat is introduced into this hydrogen-hydrocarbon stream by furnace 19 so that the temperature at the inlet of reactor 21 is approximately 960° F. The outlet temperature of reactor 21 is approximately 855° F. The pressure in reactor 21 is within the range of about 50 p.s.i.g. to about 60 p.s.i.g.

The catalyst that is employed in reactors 17 and 21 is a catalyst which comprises 0.8 weight percent platinum, 0.8 weight percent chloride, and catalytically active gamma-alumina. The catalyst is present in each reactor as $\frac{1}{16}$-inch extrudates.

Reactors 17 and 21 comprise the first reforming zone of this embodiment of the present invention. Not shown is an additional reactor in the first reforming zone, which reactor contains the same type of catalyst and which is employed as a swing reactor to be used to replace either reactor 17 or reactor 21, when the catalyst in either of these latter two reactors is being regenerated.

The effluent from the first reforming zone passes from reactor 21 through line 22, furnace 23, and line 24 into the top of reactor 25. This effluent is heated in furnace 23 so that the inlet temperature of reactor 25 is about 980° F. The pressure in reactor 25 is within the range of about 40 p.s.i.g. to about 50 p.s.i.g. The effluent from reactor 25 passes through line 26, furnace 27, and line 28 into the top of reactor 29. The inlet temperature of reactor 29 is about 980° F. The pressure in reactor 29 is within the range of about 30 p.s.i.g. to about 40 p.s.i.g.

Reactors 25 and 29 comprise the second reforming zone of this embodiment of the process of the present invention. Each of these reactors contains a catalyst comprising about 0.5 weight percent rhenium, 2.0 weight percent $K_2O$, 10.0 weight percent $Cr_2O_3$, and 87.5 weight percent large-pore-diameter alumina. This catalyst is present as 1/16-inch extrudates. Not shown in FIG. 1 is an additional reactor in the second reforming zone, which reactor is similar to reactors 25 and 29 and contains the same type of catalyst as these latter two reactors. This additional reactor is employed as a swing reactor for the second reforming zone and is used to replace either reactor 25 or reactor 29, when the catalyst in either is being regenerated.

The hydrogen-to-hydrocarbon ratio and the LHSV employed in each of the reforming zones fall within their respective ranges of values as specified hereinabove.

The effluent from reactor 29 passes through line 30, water cooler 31, and line 32 into gas-liquid separator 33. Gas-liquid separator 33 is operated at a pressure of about 15 p.s.i.g. to about 20 p.s.i.g. and a temperature of about 100° F. Liquid product is removed from separator 33 through line 34 to be sent to a suitable product recovery system, from which the high-octane-number product is obtained. Gaseous material is removed from separator 33 through line 35. A portion of this gas is removed from the system through line 36 to be used at other refinery units. The remainder of this hydrogen-hydrocarbon gas in line 35 is compressed by compressor 37 to be sent through lines 38 and 14 as hydrogen-containing recycle gas. When necessary, make-up-hydrogen-containing gas may be introduced into the system from source 39 via line 40.

The following examples are presented to enable one to more fully comprehend the process of the present invention. These examples are presented for purposes of illustration only and are not intended to limit the scope of the invention.

EXAMPLE I

A chromia-on-alumina catalyst that was promoted with small amounts of the oxides of potassium and cerium was employed to reform a Mid Continent naphtha.

The catalyst was prepared by impregnating a catalytically active gamma-alumina with a solution of chromium oxide, cerium nitrate, and potassium nitrate and drying and calcining the impregnated material to provide a composition of alumina, 19.4 weight percent $Cr_2O_3$, 1.6 weight percent $K_2O$, and 0.8 weight percent $Ce_2O_3$. This catalyst is identified hereinafter as Catalyst A.

Catalyst A was employed to reform a Mid Continent naphtha, hereinafter identified as Feedstock No. 1. Selected properties of Feedstock No. 1 are presented in Table I.

TABLE I.—FEEDSTOCK PROPERTIES

| Feedstock number | 1 | 2 | 3 | 4 | 5 | 6 |
|---|---|---|---|---|---|---|
| Gravity, ° API | 56.5 | 56.3 | 52.0 | 54.4 | 49.2 | 57.7 |
| ASTM distillation, ° F.: | | | | | | |
| IBP | 199 | 195 | | 170 | | 177 |
| 10% | 240 | 224 | | 223 | | 211 |
| 30% | | 244 | | 249 | | 231 |
| 50% | 274 | 265 | | 276 | | 251 |
| 70% | | 287 | | 308 | | 271 |
| 90% | 314 | 326 | | 352 | | 294 |
| FBP | 350 | 384 | | 394 | | 328 |
| Research Octane No., unleaded | 44.2 | 42.3 | 76.2 | 52.4 | 73.4 | |
| Sulfur, p.p.m | 260 | 12 | | | | |
| Nitrogen, p.p.m | | 2 | | | | |
| Chlorine, p.p.m | | 6 | | | | |
| Composition, vol. percent: | | | | | | |
| Paraffins | 56 | 51.5 | | 47.1 | | 49.6 |
| Naphthenes | 36 | 37.9 | | 40.8 | | 38.4 |
| Aromatics | 8 | 10.6 | | 12.1 | | 12.0 |

The reforming test employing Catalyst A and Feedstock No. 1 was conducted in a small-scale laboratory test unit. The reactants, Feedstock No. 1 and hydrogen, were passed downflow through the reactor and were released through a needle valve into a water-cooled condenser and collected in a flask that was cooled by Dry Ice. The uncondensed gas was passed into an ice trap and subsequently through a wet test meter into a gas holder. The reactor was a 36-inch stainless steel tube having an internal diameter of 1 inch. The bed of Catalyst A contained 100 cc. of the catalyst and occupied a space of about 8 inches midway along the length of the reactor. The catalyst bed was supported by glass beads and the upper or preheat section of the reactor was filled with glass beads. The temperature along the length of the catalyst bed was measured by means of a co-axial thermowell. The reactor was surrounded by an electrically-heated alumina-bronze block.

Data from this reforming test employing Catalyst A and Feedstock No. 1 are presented in Table II.

TABLE II.—DATA FROM TEST EMPLOYING CATALYST A AND FEEDSTOCK NO. 1

| Press., p.s.i.g. | H/HC, mole ratio | LHSV | Temp., ° F. | Time, hrs. | $C_5+$, Research Octane No. | $C_5+$, yield, vol. percent |
|---|---|---|---|---|---|---|
| 25 | 1.5:1 | 1.0 | 950 | 4 | 83.0 | 83.6 |
| 25 | 1.5:1 | 1.0 | 950 | 2 | 91.8 | 79.0 |
| 0 | 1.5:1 | 1.0 | 950 | 2 | 82.3 | 85.1 |
| 25 | 1.5:1 | 1.0 | 975 | 4 | 87.7 | 80.0 |
| 25 | 1.5:1 | 1.0 | 1,000 | 4 | 88.9 | 76.0 |

EXAMPLE II

A typical platinum-chloride-alumina catalyst was employed in a number of tests to reform a Mid Continent naphtha.

This catalyst was a commercially-prepared platinum reforming catalyst and contained 0.8 weight percent platinum and about 0.9 weight percent chloride on a catalytically active gamma-alumina. This catalyst is hereinafter identified as Catalyst B.

Catalyst B was employed to reform a typical Mid Continent naphtha. The properties of this Mid Continent naphtha, hereinafter identified as Feedstock No. 2, are presented in Table I.

The reforming tests employing Catalyst B and Feedstock No. 2 were conducted in automated bench-scale pilot plants. The reactor in each pilot plant was a 1-inch schedule 80 pipe having a 0.132-inch-outside-diameter thermowell located concentrically in the reactor. A heated stream of Feedstock No. 2 combined with hydrogen-containing recycle gas was charged to the top of the reactor. Effluent from the reactor was cooled and flashed in a gas-liquid separator maintained at reactor pressure. A portion of the flash gas from the separator was dried and recycled. The remainder of the flash gas was released through a pressure control valve to maintain reactor pressure. Liquid from the separator was charged to a low-pressure stabilizer to produce a stabilized liquid product to be used for analytical purposes. Gas from the stabilizer was combined with separator flash gas for measurement and analysis.

The data from the reforming tests employing Catalyst B and Feedstock No. 2 are presented in Table II.

TABLE III.—DATA FROM TESTS EMPLOYING CATALYST B AND FEEDSTOCK NO. 2

| Test No. | Press., p.s.i.g. | Recycle gas rate, s.c.f.b. | WHSV | Temp., °F. | Rec.[1], wt. percent | $C_5+$ yield, vol. percent | $C_5+$ Research Octane No. |
|---|---|---|---|---|---|---|---|
| 1 | 300 | 6,066 | 5.9 | 863 | 99.9 | 92.3 | 79.1 |
| 1 | 300 | 5,928 | 6.0 | 861 | 99.7 | 93.1 | 77.3 |
| 1 | 300 | 5,954 | 5.9 | 910 | 98.9 | 88.8 | 83.9 |
| 1 | 300 | 5,924 | 6.0 | 907 | 99.8 | 89.7 | 82.8 |
| 2 | 300 | 5,910 | 2.2 | 933 | 99.3 | 74.0 | 99.6 |
| 2 | 300 | 5,859 | 2.2 | 932 | 99.1 | 76.2 | 97.6 |
| 2 | 300 | 6,036 | 2.2 | 888 | 98.8 | 86.6 | 87.9 |
| 3 | 300 | 4,672 | 1.3 | 933 | 94.6 | 71.0 | 102.5 |
| 3 | 300 | 4,745 | 1.3 | 930 | 94.9 | 71.5 | 102.1 |
| 4 | 300 | 4,459 | 1.4 | 933 | 98.6 | 70.2 | 100.8 |
| 4 | 300 | 4,552 | 1.3 | 932 | 98.0 | 74.9 | 99.7 |
| 5 | 300 | 6,381 | 2.1 | 903 | 99.1 | 76.0 | 99.6 |
| 5 | 300 | 6,409 | 2.1 | 899 | 99.4 | 79.8 | 95.6 |
| 5 | 300 | 6,291 | 2.1 | 928 | 98.3 | 74.9 | 99.7 |
| 5 | 300 | 6,270 | 2.2 | 928 | 99.2 | 76.4 | 98.4 |
| 6 | 300 | 6,013 | 3.1 | 883 | 100.0 | 84.4 | 91.7 |
| 6 | 300 | 6,070 | 3.0 | 884 | 100.1 | 86.0 | 88.5 |
| 6 | 300 | 6,005 | 3.1 | 910 | 100.0 | 81.9 | 93.2 |
| 6 | 300 | 6,041 | 3.1 | 911 | 100.3 | 83.3 | 91.1 |
| 7 | 300 | 5,153 | 1.9 | 930 | 97.9 | 71.0 | 102.6 |
| 7 | 300 | 5,200 | 1.9 | 930 | 98.4 | 74.7 | 100.0 |
| 8 | 300 | 5,678 | 1.7 | 938 | 101.3 | 70.5 | 100.4 |
| 8 | 300 | 5,798 | 1.7 | 942 | 100.4 | 72.6 | 97.2 |
| 9 | 300 | 5,807 | 2.2 | 903 | 98.3 | 78.5 | 97.2 |
| 9 | 300 | 5,997 | 2.1 | 903 | 100.2 | 79.5 | 95.0 |
| 9 | 300 | 5,974 | 2.1 | 930 | 99.5 | 74.0 | 99.5 |
| 9 | 300 | 5,952 | 2.1 | 931 | 99.3 | 76.6 | 97.4 |
| 10 | 300 | 5,597 | 1.4 | 932 | 100.1 | 67.7 | 103.3 |
| 10 | 300 | 5,665 | 1.4 | 934 | 100.8 | 71.4 | 101.7 |
| 10 | 300 | 5,759 | 4.8 | 839 | 100.3 | 94.9 | 70.7 |
| 10 | 300 | 5,847 | 4.7 | 838 | 99.6 | 95.1 | 69.9 |
| 11 | 300 | 5,285 | 2.1 | 903 | 98.2 | 80.9 | 102.7 |
| 11 | 300 | 5,435 | 2.1 | 903 | 98.3 | 79.1 | 96.9 |
| 11 | 300 | 5,418 | 2.1 | 929 | 97.7 | 74.6 | 100.3 |
| 11 | 300 | 5,381 | 2.1 | 930 | 100.0 | 74.7 | 99. |
| 12 | 300 | 5,582 | 3.1 | 887 | 99.8 | 85.1 | 89.7 |
| 12 | 300 | 5,528 | 3.1 | 887 | 99.5 | 86.8 | 86.9 |
| 12 | 300 | 5,634 | 3.1 | 911 | 100.3 | 82.7 | 90.7 |
| 12 | 300 | 5,654 | 3.0 | 915 | 99.6 | 83.6 | 89.6 |
| 13 | 300 | 5,723 | 1.4 | 924 | 97.6 | 67.7 | 103.5 |
| 13 | 300 | 5,851 | 1.3 | 926 | 97.6 | 70.0 | 102.4 |

[1] Recovery.

EXAMPLE III

A chromia-on-alumina catalyst promoted by a small amount of potassium oxide was employed to reform a feedstock comprising a mildly reformed Mid Continent naphtha.

This alkalized chromia-on-alumina catalyst was prepared by impregnating a 300-gram portion of American Cyanamid Company Aero 100 gamma-alumina with a solution prepared by dissolving in 250 ml. of distilled water 36.0 grams of $K_2Cr_2O_3$ and 21.75 grams of $CrO_3$ and by adding to this mixture 30 ml. of concentrated ammonium hydroxide. The alumina comprised 1/16-inch extrudates. The impregnated alumina was dried in static air under a heat lamp and then calcined for 2 hours in static air at a temperature of 1,000° F. The calcined catalyst, hereinafter identified as Catalyst C, was prepared to contain 10.1 weight percent $Cr_2O_3$, 3.3 weight percent $K_2O$, and 86.6 weight percent alumina.

The feedstock was a mildly reformed Mid Continent naphtha, which Mid Continent naphtha was similar to Feedstock No. 2. This mild reforming was conducted commercially and provided the hydrocarbon feed identified hereinafter as Feedstock No. 3. The properties of Feedstock No. 3 are presented in Table I.

The reforming of Feedstock No. 3 over Catalyst C was carried out in an automated small-scale test unit at a temperature of 1,000° F. and a pressure of 30 p.s.i.g. A mixture of hydrogen and hydrocarbons was heated in a preheat zone and subsequently subjected to additional preheating in the top of the reactor of the unit. The reactor was prepared from ½-inch schedule 80 stainless steel pipe and contained 20 ml. of catalyst (20–40 mesh material) in the middle section of the reactor. This catalyst bed was 8 inches in length. The 16-inch portion at each end of the reactor was packed with 1/16-inch stainless steel packing of the type used in Podbielniak columns. The catalyst bed temperature was measured by a travelling thermocouple, which passed through a co-axial thermowell. The effluent lines emanating from the reactor were heated electrically to keep the product in the vapor form until the sample could be removed into a gas chromatographic unit. After passing the sampling point, the product was cooled and the condensed liquid product was collected in a cooled receiver while the gas was released through a pressure control valve into a metering and sampling system.

The data from the test employing Catalyst C and Feedstock No. 3 are presented in Table IV.

TABLE IV.—DATA FROM TESTS EMPLOYING CATALYST C AND FEEDSTOCK NO. 3

| Test No. | LHSV | Moles $H_2$ per mole feed | Time on stream, min. | $C_5+$, yield vol. percent | $C_5+$, research octane No. |
|---|---|---|---|---|---|
| 1 | 0.5 | 4.2 | 110 | 82.5 | 98.8 |
|   |     |     | 182 | 81.7 | 100.7 |
|   |     |     | 1,454 | 82.8 | 98.3 |
| 2 | 0.4 | 2.25 | 105 | 81.0 | 101.9 |
|   |     |     | 1,154 | 80.0 | 97.0 |
|   |     |     | 106 | 78.7 | 100.1 |
| 3 | 1.0 | 1.1 | 242 | 80.6 | 100.1 |
|   |     |     | 307 | 81.4 | 96.0 |

EXAMPLE IV

A catalyst comprising chromia-on-alumina promoted by potassium oxide and rhenium was employed to reform a mildly reformed Mid Continent naphtha.

This rhenium-promoted catalyst was prepared by impregnating a 100-gram portion of American Cyanamid Company Aero 100 alumina with two solutions. The first solution comprised 85 ml. and contained 8.0 grams of $K_2Cr_2O_7$ and 13.0 grams of $CrO_3$. The second solution comprised 50 ml. and contained 1.30 grams of $Re_2O_7$. After the alumina was impregnated with the first solution, the impregnated material was dried in static air under a heat lamp. The dried impregnated alumina was then impregnated with the second solution. The material resulting from the latter impregnation was subsequently dried under a heat lamp in static air and then calcined in static air at a temperature of 450° C. for a period of 2 hours. The catalyst, hereinafter identified as Catalyst D, was prepared to contain 0.8 weight percent rhenium, 11.9 weight percent $Cr_2O_3$, 2.2 weight percent $K_2O$, and 85.1 weight percent alumina.

Catalyst D was employed to reform the Feedstock No. 3 employed in Example III. This Feedstock No. 3 comprised a mildly-reformed Mid Continent naphtha. The properties of Feedstock No. 3 are presented in Table I.

This test was conducted in a test unit similar to that described in Example III at a temperature of 1,000° F. and a LHSV of 1.0.

The data from this reforming test employing Catalyst D and Feedstock No. 3 are presented in Table V.

TABLE V.—DATA FROM TESTS EMPLOYING CATALYST D AND FEEDSTOCK NO. 3

| Test No. | Press., p.s.i.g. | Mole H₂ per mole feed | Time on stream, min. | C₅+, yield vol. percent | C₅+, research octane No. |
|---|---|---|---|---|---|
| 1 | 30 | 1.9 | 55 | 74.7 | 103.5 |
|   |    |     | 129 | 81.5 | 102.3 |
|   |    |     | 206 | 81.6 | 102.0 |
|   |    |     | 281 | 82.6 | 101.5 |
| 2 | 17 | 1.4 | 25 | 80.4 | 104.0 |
|   |    |     | 96 | 80.6 | 103.0 |
|   |    |     | 163 | 82.1 | 102.0 |
|   |    |     | 247 | 82.8 | 101.2 |
| 3 | 51 | 2.2 | 25 | 80.4 | 100.0 |
|   |    |     | 102 | 80.9 | 101.6 |
|   |    |     | 162 | 81.0 | 101.2 |
|   |    |     | 247 | 82.8 | 99.6 |
|   |    |     | 363 | 81.5 | 100.5 |
|   |    |     | 1,337 | 83.8 | 96.0 |

Figure 2:
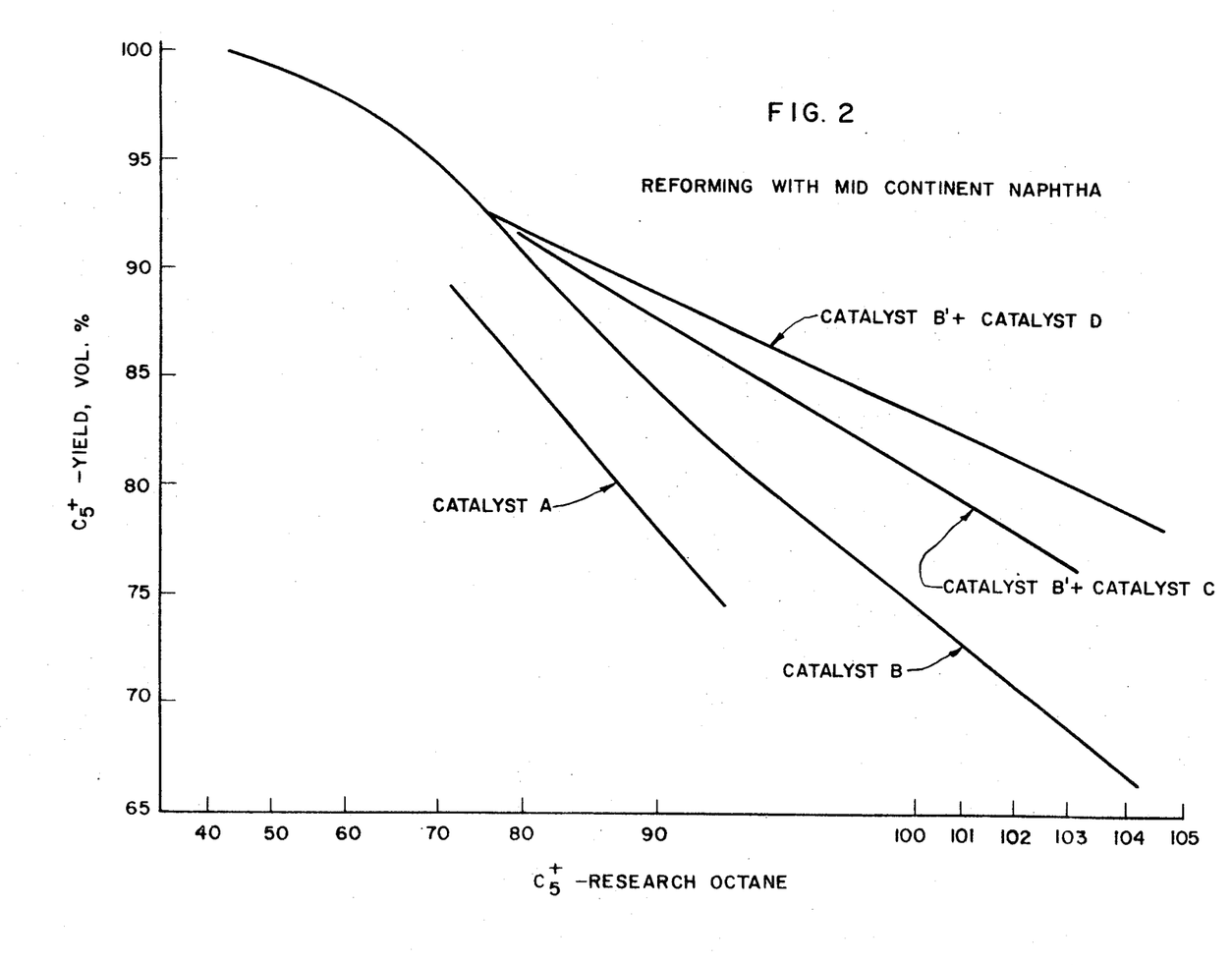
FIG. 2 presents a comparison of the $C_5{}^+$-reformate yields obtained from embodiments of the process of the present invention to those obtained from a conventional reforming process employing a platinum-halide-alumina catalyst and to those obtained from a reforming process employing a chromia-on-alumina catalyst, when each process is used to convert a Mid Continent naphtha.

The data obtained from the reforming of Mid Continent naphtha in the above examples are represented by lines in FIG. 2. FIG. 2 shows 4 lines, each of said lines representing the data presented in one of the above-described examples. For example, the line marked "Catalyst A" represents the data obtained in Example I with Catalyst A and presented in Table II. The line marked "Catalyst B" represents the data obtained with Catalyst B in Example II and listed in Table III. The line marked "Catalyst B'+Catalyst C" represents the data obtained with the mildly reformed naphtha and Catalyst C in Example III and presented in Table IV. The line marked "Catalyst B'+Catalyst D" represents the data obtained with the mildly reformed naphtha and Catalyst D in Example IV and presented in Table V. In each of these latter two instances, the naphtha was reformed initially over a platinum-chloride-alumina catalyst similar to Catalyst B; hence, the designation on the lines as "Catalyst B'+."

These data indicate that the reforming of a Mid Continent naphtha in a two-catalyst system, Catalyst 1 being a typical platinum-chloride-alumina catalyst and Catalyst 2 being a chromia-on-alumina catalyst promoted with rhenium and with an oxide of an alkali metal, provides yields which are superior to those of the processes employing either one, but not both, of these catalysts. In addition, the data show that a combination of a platinum-chloride-alumina catalyst and chromia-on-alumina catalyst promoted with the oxide of an alkali metal is superior to reforming with either of these catalysts when used alone. Moreover, FIG. 2 shows that the two-catalyst system in which the second catalyst was promoted with rhenium provides the best yield performance. The dual-catalyst process employing, as the second catalyst, this catalyst comprising alkalized chromia-on-alumina promoted with rhenium, is a preferred embodiment of the process of the present invention. Moreover, the other two-catalyst process is another embodiment of the process of the present invention.

EXAMPLE V

A chromia-on-alumina catalyst promoted with the oxide of potassium and with rhenium was employed to reform a naphtha having a relatively high concentration of naphthenes. This naphtha hereinafter will be referred to as a naphthenic naphtha.

The catalyst was prepared by impregnating a 352-gram portion of American Cyanamid Company Aero 100 alumina with two aqueous solutions. The first solution comprised 400 ml. and contained 44.0 grams of $(NH_4)_2Cr_2O_7$ and 26.0 grams of $K_2Cr_2O_7$. The alumina impregnated with the first solution was dried under a heat lamp and then impregnated with the second solution. This second solution comprised 200 ml. and contained 2.70 grams of perrhenic acid. The impregnated material was then dried in static air under a heat lamp and calcined in static air at 400° C. for a period of 3 hours. The catalyst, hereinafter identified as Catalyst E, was prepared to contain 2.0 weight percent $K_2O$, 0.5 weight percent rhenium, 10.0 weight percent $Cr_2O_3$, and 87.5 weight percent alumina. Catalyst E was employed to reform the naphthenic naphtha. The properties of this naphthenic naphtha, hereinafter identified as Feedstock No. 4, are presented in Table I.

The test unit employed in this test was similar to the one described in Example III.

The data obtained from this reforming test employing Catalyst E and Feedstock No. 4 are presented in Table VI.

TABLE VI.—DATA FROM TESTS EMPLOYING CATALYST E AND FEEDSTOCK NO. 3

| Test number | Temp., °F. | Press., p.s.i.g. | LHSV | Mole H₂ per mole feed | Yield, vol. percent | Research Octane No. |
|---|---|---|---|---|---|---|
| 1 | 1,000 | 30 | 0.5 | 2.5 | 83.7 | 92.8 |
| 2 | 1,000 | 30 | 0.25 | 2.9 | 77.1 | 97.9 |

EXAMPLE VI

A typical platinum-chloride-alumina catalyst was employed in a number of tests to reform the naphthenic naphtha.

The catalyst was another portion of the catalyst that was employed in Example II. Hence, this catalyst is identified hereinafter as Catalyst B.

Catalyst B was employed to reform Feedstock No. 4, the naphthenic naphtha which was employed in Example V.

The reforming tests employing Catalyst B and Feedstock No. 4 were conducted in test units similar to the unit described in Example II.

The data from the reforming tests employing Catalyst B and Feedstock No. 4 are presented in Table VII.

TABLE VII.—DATA FROM TESTS EMPLOYING CATALYST B AND FEEDSTOCK NO. 4

| Test No. | Press., p.s.i.g. | Recycle gas rate, s.c.f.b. | WHSV | Temp., °F. | Rec.,[1] wt. percent | $C_5+$ yield vol. percent | $C_5+$ Research Octane No. |
|---|---|---|---|---|---|---|---|
| 1 | 300 | 5,201 | 2.2 | 900 | 100.1 | 83.1 | 96.3 |
| 1 | 300 | 5,278 | 2.1 | 989 | 100.0 | 84.5 | 95.5 |
| 1 | 300 | 5,238 | 2.1 | 926 | 99.3 | 81.1 | 99.3 |
| 1 | 300 | 5,185 | 2.1 | 924 | 99.0 | 81.7 | 98.2 |
| 2 | 300 | 4,972 | 1.4 | 932 | 99.1 | 79.3 | 105.0 |
| 2 | 300 | 5,179 | 1.3 | 928 | 98.7 | 75.0 | 103.7 |
| 3 | 300 | 5,055 | 2.2 | 903 | 98.6 | 82.2 | 98.0 |
| 3 | 300 | 5,393 | 2.1 | 898 | 100.3 | 83.2 | 95.6 |
| 3 | 300 | 5,289 | 2.1 | 924 | 99.6 | 79.4 | 100.2 |
| 3 | 300 | 5,211 | 2.1 | 923 | 98.2 | 80.6 | 99.7 |
| 4 | 300 | 5,024 | 1.4 | 932 | 99.9 | 68.3 | 104.7 |
| 4 | 300 | 4,967 | 1.4 | 926 | 99.9 | 74.7 | 102.8 |
| 5 | 300 | 4,953 | 1.4 | 929 | 100.6 | 70.1 | 104.0 |
| 5 | 300 | 5,039 | 1.4 | 925 | 99.5 | 75.1 | 102.3 |
| 6 | 300 | 5,086 | 2.2 | 900 | 99.9 | 78.2 | 99.3 |
| 6 | 300 | 5,133 | 2.2 | 899 | 99.7 | 82.6 | 96.6 |
| 6 | 300 | 5,107 | 2.2 | 927 | 99.4 | 79.0 | 100.7 |
| 6 | 300 | 5,092 | 2.2 | 925 | 99.5 | 79.2 | 100.2 |
| 7 | 300 | 5,141 | 1.4 | 927 | 99.7 | 67.8 | 105.0 |
| 7 | 300 | 4,885 | 1.4 | 922 | 100.9 | 74.1 | 102.6 |
| 8 | 300 | 5,455 | 2.1 | 899 | 100.4 | 79.1 | 99.4 |
| 8 | 300 | 5,441 | 2.1 | 895 | 100.2 | 82.8 | 97.3 |
| 8 | 300 | 5,458 | 2.1 | 921 | 100.6 | 78.0 | 101.1 |
| 8 | 300 | 5,384 | 2.1 | 919 | 99.5 | 80.3 | 100.1 |
| 9 | 300 | 5,019 | 1.4 | 929 | 99.9 | 71.6 | 104.5 |
| 9 | 300 | 5,009 | 1.4 | 925 | 99.6 | 76.5 | 103.2 |
| 10 | 300 | 5,191 | 2.2 | 898 | 100.1 | 78.0 | 99.4 |
| 10 | 300 | 5,210 | 2.2 | 899 | 100.3 | 81.9 | 97.1 |
| 10 | 300 | 5,230 | 2.2 | 927 | 100.4 | 77.3 | 100.7 |
| 10 | 300 | 5,410 | 2.1 | 925 | 100.0 | 78.8 | 100.0 |
| 11 | 300 | 4,923 | 1.4 | 930 | 100.0 | 74.0 | 104.9 |
| 11 | 300 | 4,999 | 1.4 | 929 | 99.6 | 78.2 | 102.9 |
| 12 | 300 | 4,756 | 1.5 | 927 | 101.1 | 68.7 | 104.3 |
| 12 | 300 | 4,920 | 1.4 | 925 | 100.3 | 75.5 | 102.7 |
| 13 | 300 | 4,778 | 1.5 | 930 | 100.4 | 72.7 | 102.6 |
| 13 | 300 | 4,863 | 1.5 | 930 | 99.6 | 75.2 | 102.0 |
| 13 | 300 | 4,945 | 1.4 | 930 | 100.1 | 76.2 | 101.3 |
| 13 | 300 | 4,922 | 1.4 | 928 | 99.6 | 76.4 | 101.1 |
| 13 | 300 | 4,930 | 1.4 | 928 | 99.6 | 77.0 | 100.8 |
| 13 | 300 | 4,930 | 1.4 | 926 | 99.0 | 77.5 | 100.6 |
| 13 | 300 | 4,938 | 1.4 | 925 | 99.4 | 77.8 | 100.3 |
| 13 | 300 | 4,943 | 1.4 | 926 | 99.9 | 78.1 | 100.1 |
| 13 | 300 | 4,949 | 1.4 | 925 | 99.4 | 78.1 | 100.0 |

[1] Recovery.

EXAMPLE VII

A chromia-on-alumina catalyst promoted with potassium oxide and with rhenium was employed to reform a mildly-reformed portion of the above naphthenic naphtha.

The catalyst employed in this reforming test was another portion of Catalyst E, which was described and used in Example V.

Catalyst E was employed to reform the mildly-reformed naphthenic naphtha, hereinafter identified as Feedstock No. 5. Feedstock No. 5 was the naphthenic naphtha that had been mildily reformed in a small-scale unit over a platinum-chloride-alumina catalyst similar to Catalyst B. This mild reforming treatment was conducted in a small-scale test unit similar to the one described in Example II. Selected properties of Feedstock No. 5 are presented in Table I.

The reforming test employing Catalyst E and Feedstock No. 5 was conducted in a small-scale laboratory test unit similar to the one described in Example III.

Data obtained from this reforming test employing Catalyst E and Feedstock No. 5 are presented in Table VIII.

Figure 3:
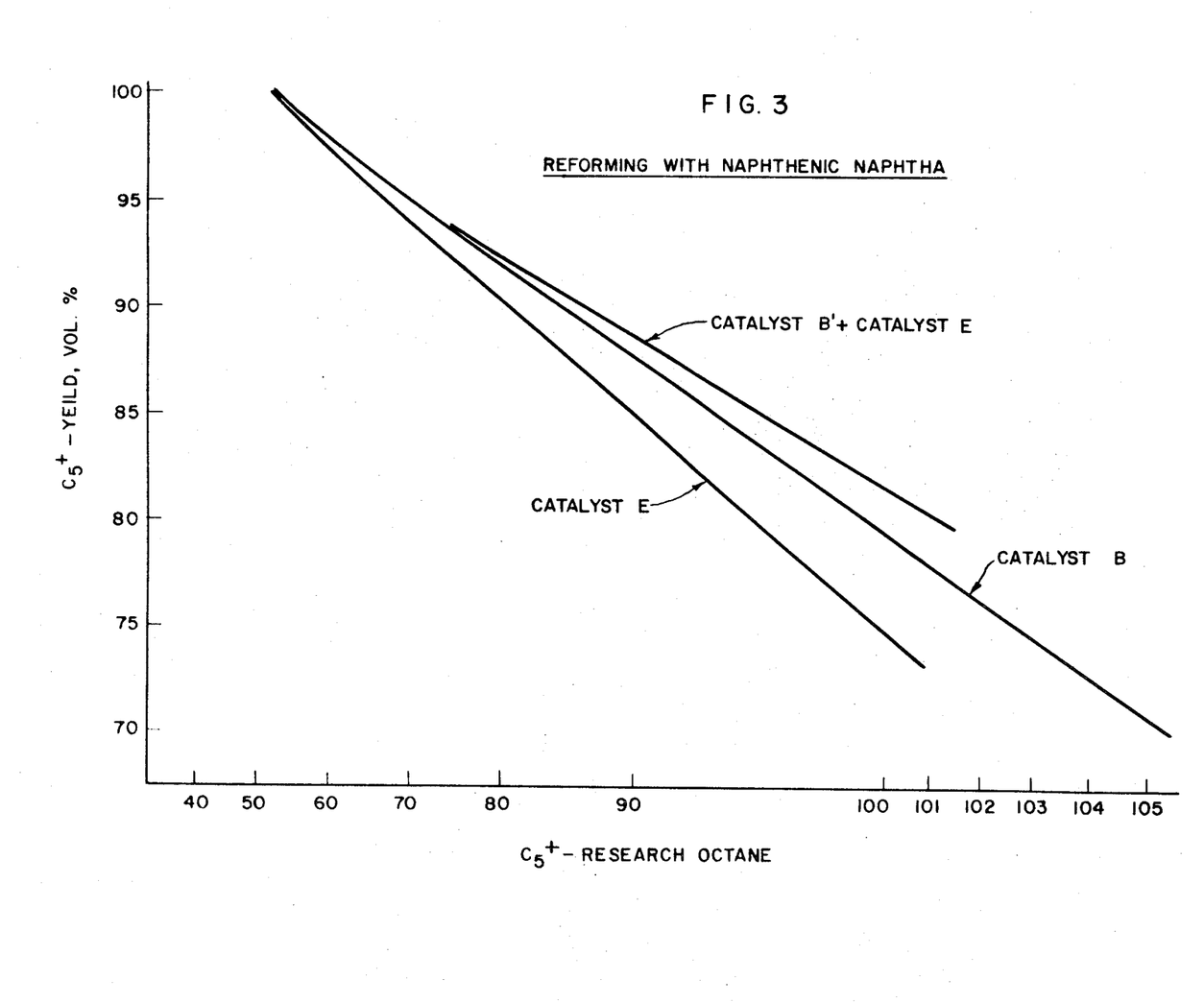
FIG. 3 presents a comparison of the $C_5^+$-reformate yields obtained from an embodiment of the process of the present invention to those obtained from a conventional reforming process employing a platinum-halide-alumina catalyst and to those obtained from a reforming process employing a chromia-on-alumina catalyst promoted by a small amount of rhenium, when each of the processes is used to convert a naphtha having a relatively high content of naphthenes.

The data obtained from the reforming tests conducted in Examples V through VII are compared in FIG. 3.

Here again, the data from a particular test are represented by a line, while the data points supporting that line may be found in the table in the respective example. Since the top line in FIG. 3 represents data obtained from a test involving Catalyst E and a mildly reformed naphtha which was reformed initially over a platinum-chloride-alumina catalyst similar to Catalyst B, the line in FIG. 3 is identified as "Catalyst B'+Catalyst E."

FIG. 3 shows that the embodiment of the process of the present invention, that is, the process exemplified by the test performed in Example VII, is superior to a reforming process which employs only one of the catalysts used in the process of the present invention.

The comparisons made in FIGS. 2 and 3 hereinabove clearly demonstrate that the embodiments of the process of the present invention are superior to prior-art reforming processes.

EXAMPLE VIII

In this example is presented an embodiment of the process of the present invention wherein relative low pressures are employed.

TABLE VIII.—DATA FROM TESTS EMPLOYING CATALYST E AND FEEDSTOCK NO. 5

| Test number | Temp., °F. | Press., p.s.i.g. | LHSV | Mole $H_2$ per mole feed | Yield, vol. percent | Research Octane No. |
|---|---|---|---|---|---|---|
| 1 | 1,000 | 30 | 1.0 | 2.4 | 91.6 | 95.4 |
| 2 | 1,000 | 30 | 0.5 | 2.3 | 89.3 | 96.8 |
| 3 | 1,000 | 30 | 1.0 | 2.5 | 90.0 | 96.9 |

A reforming catalyst containing 0.8 weight percent platinum and 0.8 weight percent chloride on gamma-alumina was one of the catalysts employed in the tests described in this example. The catalyst, identified hereinafter as Catalyst F, was commercially prepared by the American Cyanamid Company.

The other catalyst employed in this example comprised chromia, rhenium, and calcium oxide on alumina. This catalyst was prepared in the laboratory. A 176.0-gram portion of American Cyanamid Company Aero 100 alumina ($\frac{1}{16}$-inch extrudates) was impregnated with 200 ml. of an aqueous solution containing 33.0 grams of $$(NH_4)_2Cr_2O_7$$

8.4 grams of $Ca(NO_3)_2 \cdot 4H_2O$, and 1.86 grams of perrhenic acid solution (54% rhenium). The water was evaporated from the impregnated material in static air at room temperature. Subsequently, the material was calcined in static air at a temperature of 400° C. for 2 hours. This catalyst, identified hereinafter as Catalyst G, was prepared to contain 10.0 weight percent $Cr_2O_3$, 0.5 weight percent rhenium, 1.0 weight percent calcium oxide, and 88.5 weight percent catalytically active gamma-alumina.

In the two tests discussed below wherein only Catalyst F was employed, a unit similar to that described in Example II hereinabove was used. In the two tests wherein both Catalysts F and G were used, the unit described hereinbelow was employed.

The unit containing both Catalysts F and G was an automated small-scale reforming unit containing 2 reactors. The reactors were surrounded by electrically heated blocks and were separated by a pressure reducing valve. Each of the reactors was 20 inches in length and was made from $\frac{3}{8}$-inch heavy wall tubing. Each had a $\frac{1}{8}$-inch co-axial thermowell extending up through the reactor. Hydrogen was supplied to the unit by means of cylinders and the liquid hydrocarbon feed was introduced into the system by means of a positive displacement pump. The hydrogen and hydrocarbons were mixed and preheated to the desired reaction temperature over 4 inches of $\frac{1}{16}$-inch alundum balls. The heated stream was passed sequentially through the two reactors. Each of the catalyst beds was located in the $\frac{1}{8}$-inch annular space between the reactor wall and the thermowell and had a bed length ranging from 1½ inches to 6 inches. The first reactor, containing Catalyst F, was operated at a pressure of 60 p.s.i.g., while the second reactor containing Catalyst G, was operated at a pressure of 30 p.s.i.g. The liquid product was collected at the pressure of the last reactor in a heavy wall glass receiver that was cooled by Dry Ice. Light hydrocarbons were separated from the hydrogen off-gas by a series of traps cooled with liquid nitrogen. Liquid samples were weighed and light hydrocarbons were vaporized and measured volumetrically. Both liquid and gas samples were analyzed by means of an F-M Research chromatograph equipped with hydrogen flame detectors. The hydrocarbon-free hydrogen was measured by a wet test meter and vented from the system.

In the tests of this example, two catalyst systems were compared to one another. In the first catalyst system, only Catalyst F was employed. The second catalyst system comprised Catalyst F as a first catalyst and Catalyst G as a second catalyst, the naphtha that was being converted passing sequentially over Catalyst F and Catalyst G. Each of the catalyst systems was used to reform individually two naphthas. The two naphthas were the naphthenic naphtha, Feedstock No. 4, and a Mid Continent naphtha, Feedstock No. 6. Properties of each of these feedstocks are presented in Table I hereinabove.

The data from the tests of this example are presented in Table IX.

TABLE IX.—DATA DEMONSTRATING LOW-PRESSURE OPERATION

| | Test number | | | | | |
|---|---|---|---|---|---|---|
| | 1 | 2 | | 3 | 4 | |
| Feed number | 6 | 6 | | 4 | 4 | |
| Reactor | 1 | 1 | 2 | 1 | 1 | 2 |
| Catalyst | F | F | G | F | F | G |
| Temperature, °F | 929 | 923 | 981 | 926 | 905 | 990 |
| Pressure, p.s.i.g | 300 | 60 | 30 | 300 | 60 | 30 |
| LHSV | 2.0 | 5.0 | 1.0 | 1.4 | 5.0 | 1.0 |
| Recovery, wt. percent | 99.4 | 98.7 | | 98.8 | 99.2 | |
| $C_5+$ yield, vol. percent | 75.5 | 83.0 | | 75.3 | 79.9 | |
| Aromatics yield, vol. percent | 51.2 | 60.3 | | 57.9 | 63.8 | |
| $C_5+$ unleaded Research Octane Number | 99.6 | 99.0 | | 102.6 | 101.7 | |
| Product analysis, wt. percent: | | | | | | |
| $H_2$ | 2.04 | 2.54 | | 2.13 | 2.78 | |
| $C_1$ | 1.34 | 1.21 | | 2.29 | 1.74 | |
| $C_2$ | 2.90 | 1.70 | | 3.04 | 2.14 | |
| $C_3$ | 5.81 | 1.71 | | 5.31 | 3.05 | |
| $i-C_4$ | 3.14 | 0.63 | | 2.35 | 1.19 | |
| $n-C_4$ | 4.23 | 1.26 | | 3.22 | 1.80 | |
| $i-C_5$ | 4.68 | 1.19 | | 3.69 | 1.91 | |
| $n-C_5$ | 2.73 | 1.15 | | 2.14 | 1.32 | |
| $C_6+$ | 73.13 | 88.61 | | 75.82 | 84.07 | |

These yield data points were obtained from tests which provided approximately the same octane numbers. In each case, the data were obtained from a typical test period. In the case of the test employing only Catalyst F, the product sample was an accumulated sample from hour 36 to hour 43.2 of the period. In the case of the dual-catalyst system, the product sample was a sample accumulated from hour 3 to hour 20 of the test period.

The data in Table IX demonstrate the superiority of the dual-catalyst system, i.e., an embodiment of the process of the present invention, over the conventional platinum - halide - alumina - catalyst reforming process, even though the dual-catalyst system is operated at a much lower pressure. Not only are the yields superior, but also the system does not require cooling and reheating of the effluent from the first reactor to the second reactor. Only a single hydrogen recycle and compressor system is required. This type of operation should, consequently, have economic advantages.

What is claimed is:

1. An improved process for reforming a petroleum hydrocarbon fraction to obtain a product having a high octane number, which process comprises contacting said hydrocarbon fraction in a first reforming zone under reforming conditions and in the presence of hydrogen with a first catalyst comprising a Group VIII noble metal, a halide, and a catalytically active alumina to produce a first reformate and subsequently contacting said first reformate in a second reforming zone under reforming conditions and in the presence of hydrogen with a second catalyst comprising the oxides of chromium, a small amount of rhenium, a member selected from the group consisting of an oxide of an alkali metal, an oxide of an alkaline earth metal, and mixtures thereof, and catalytically active alumina.

2. The process of claim 1 wherein said rhenium of said second catalyst is present in an amount within the range of about 0.1 weight percent to about 5.0 weight percent, based on the total weight of said second catalyst.

3. The process of claim 1 wherein said oxides of chromium of said second catalyst are present in an amount within the range of about 5 weight percent to about 25 weight percent, calculated as $Cr_2O_3$ and based on the total weight of said second catalyst.

4. The process of claim 1 wherein said member of said second catalyst is present in an amount within the range of about 0.1 to about 5.0 weight percent, calculated as the oxide and based on the total weight of said second catalyst.

5. The process of claim 1 wherein said petroleum hydrocarbon fraction is a member selected from the group consisting of a virgin naphtha, a cracked naphtha, a hydrocarbon fraction boiling in the gasoline boiling range, and mixtures thereof.

6. The process of claim 1, wherein said first reformate has a paraffins-to-naphthenes ratio of at least 5 to 1.

7. The process of claim 1 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F. to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

8. The process of claim 2 wherein said oxides of chromium of said second catalyst are present in an amount within the range of about 5 weight percent to about 25 weight percent, calculated as $Cr_2O_3$ and based on the total weight of said second catalyst.

9. The process of claim 2 wherein said member of said second catalyst is present in an amount within the range of about 0.1 to about 5.0 weight percent, calculated as the oxide and based on the total weight of said second catalyst.

10. The process of claim 2 wherein said petroleum hydrocarbon fraction is a member selected from the group consisting of a virgin naphtha, a cracked naphtha, a hydrocarbon fraction boiling in the gasoline boiling range, and mixtures thereof.

11. The process of claim 2 wherein said first reformate has a paraffins-to-naphthenes ratio of at least 5 to 1.

12. The process of claim 2 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F. to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

13. The process of claim 5 wherein said first reformate has a paraffins-to-naphthenes ratio of at least 5 to 1.

14. The process of claim 5 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F. to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

15. The process of claim 6 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F. to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

16. The process of claim 8 wherein said member of said second catalyst is present in an amount within the range of about 0.1 to about 5.0 weight percent, calculated as the oxide and based on the total weight of said second catalyst.

17. The process of claim 10 wherein said first reformate has a paraffins-to-naphthenes ratio of at least 5 to 1.

18. The process of claim 10 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F. to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

19. The process of claim 11 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F. to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

20. The process of claim 13 wherein said reforming conditions in said first reforming zone comprise an average catalyst bed temperature of about 800° F., to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F. to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

21. The process of claim 16 wherein said petroleum hydrocarbon fraction is a member selected from the group consisting of a virgin naphtha, a cracked naphtha, a hydrocarbon fraction boiling in the gasoline boiling range, and mixtures thereof.

22. The process of claim 16 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F. to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

23. The process of claim 17 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F. to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

24. The process of claim 21 wherein said first reformate has a paraffins-to-naphthenes ratio of at least 5 to 1.

25. The process of claim 21 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F. to about 1,050° F. a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

26. The process of claim 21 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 920° F. to about 1,000° F., a total pressure of about 20 p.s.i.g. to about 45 p.s.i.g., a hydrogen-to-hydrocarbon ratio of about 1,000 s.c.f.b. to about 5,000 s.c.f.b., and a LHSV of about 0.2 to about 1.5 volumes of hydrocarbon per hour per volume of catalyst.

27. The process of claim 24 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 900° F., to about 1,050° F., a total pressure of about 0 p.s.i.g. to about 100 p.s.i.g., a hydrogen-to-hydrocarbon ratio of about 500 s.c.f.b. to about 10,000 s.c.f.b., and a LHSV of about 0.1 to about 5.0 volumes of hydrocarbon per hour per volume of catalyst.

28. The process of claim 24 wherein said reforming conditions in said first reforming zone comprise an average catalyst bed temperature of about 800° F. to about 1,050° F., a total pressure of about 50 p.s.i.g. to about 1,000 p.s.i.g., a hydrogen-to-hydrocarbon ratio of about 1,000 s.c.f.b. to about 12,000 s.c.f.b., and a LHSV of about 0.1 to about 10 volumes of hydrocarbon per hour per volume of catalyst and wherein said reforming conditions in said second reforming zone comprise an average catalyst bed temperature of about 920° F. to about 1,000° F., a total pressure of about 20 p.s.i.g. to about 45 p.s.i.g., a hydrogen-to-hydrocarbon ratio of about 1,000 s.c.f.b. to about 5,000 s.c.f.b., and a LHSV of about 2.0 to about 1.5 volumes of hydrocarbon per hour per volume of catalyst.

29. The process of claim 27 wherein said Group VIII noble metal of said first catalyst is platinum and wherein said halide of said first catalyst is chloride.

30. The process of claim 28 wherein said Group VIII noble metal of said first catalyst is platinum and wherein said halide of said first catalyst is chloride.

References Cited

UNITED STATES PATENTS

| | | | |
|---|---|---|---|
| 2,758,062 | 8/1956 | Arundale et al. | 208—65 |
| 2,849,376 | 8/1958 | Watson | 208—65 |
| 3,017,344 | 1/1962 | Woodle | 208—65 |
| 3,033,777 | 5/1962 | Moy et al. | 208—65 X |
| 3,296,118 | 1/1967 | Czajkowski et al. | 208—138 X |
| 3,179,602 | 4/1965 | Gremillion | 208—136 X |
| 3,436,335 | 4/1969 | Maziuk | 208—65 |
| 3,198,728 | 8/1965 | Evans | 208—65 |

JAMES E. POER, Primary Examiner

H. M. S. SNEED, Assistant Examiner

U.S. Cl. X.R.

208—136; 252—467

UNITED STATES PATENT OFFICE
CERTIFICATE OF CORRECTION

Patent No. 3,705,096　　　　　　　　Dated　December 5, 1972

Inventor(s)　　David A. McCaulay et al.

It is certified that error appears in the above-identified patent and that said Letters Patent are hereby corrected as shown below:

Column 9, line 28, "99." should read -- 99.2 --;

Column 9, line 29, "86.9" should read -- 86.7 --.

Column 20, line 25, "2.0" should read -- 0.2 --.

Signed and sealed this 1st day of May 1973.

(SEAL)
Attest:

EDWARD M. FLETCHER, JR.　　　　　　　ROBERT GOTTSCHALK
Attesting Officer　　　　　　　　　　Commissioner of Patents